R. REA.
DEHYDRATOR FOR FRUITS, VEGETABLES, AND OTHER FOODS.
APPLICATION FILED OCT. 15, 1920.
1,410,719.
Patented Mar. 28, 1922.
2 SHEETS—SHEET 2.
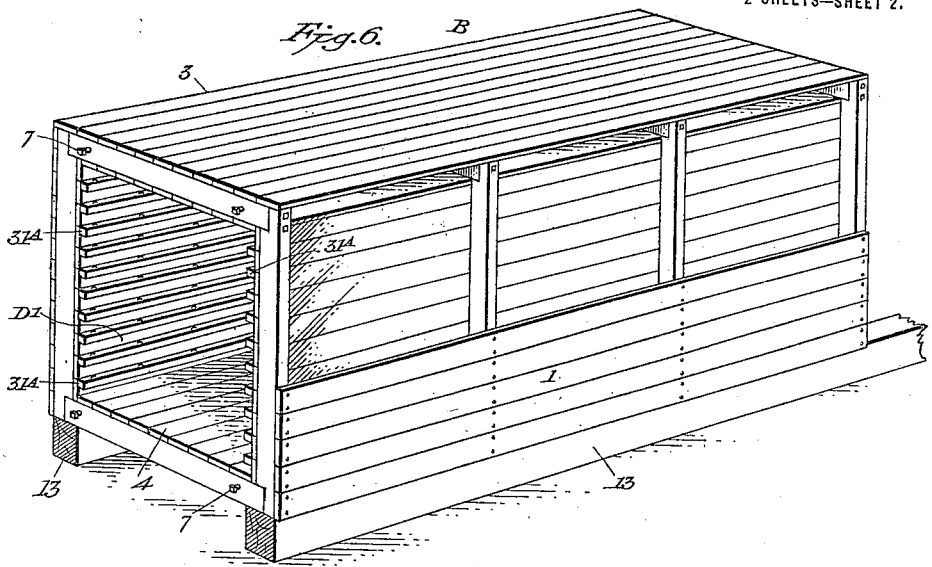
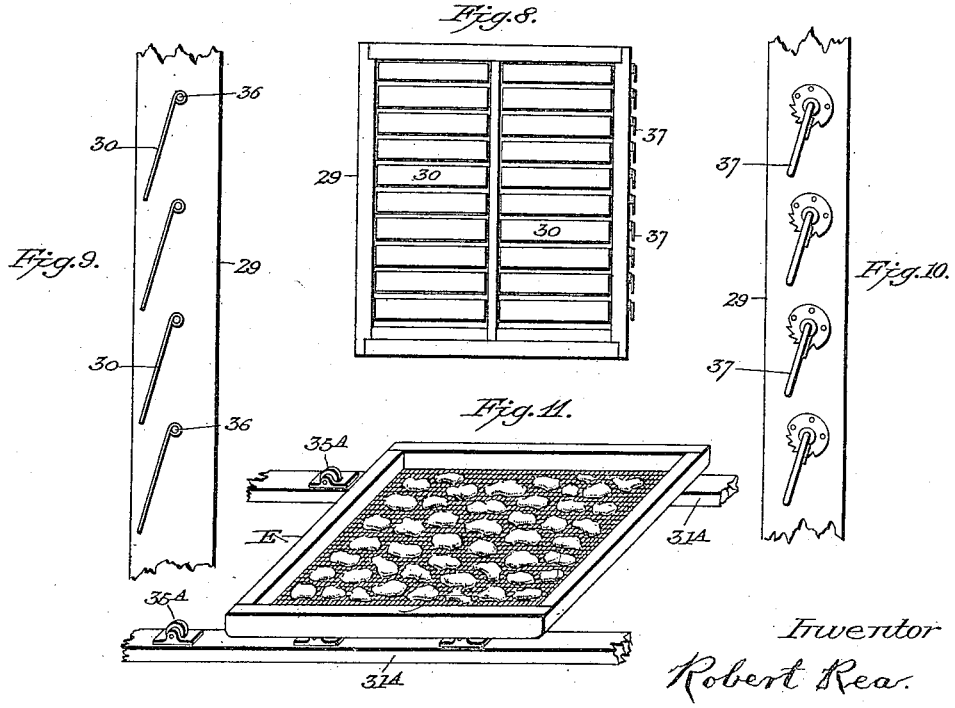
Inventor
Robert Rea.
By H. S. Bailey. Attorney

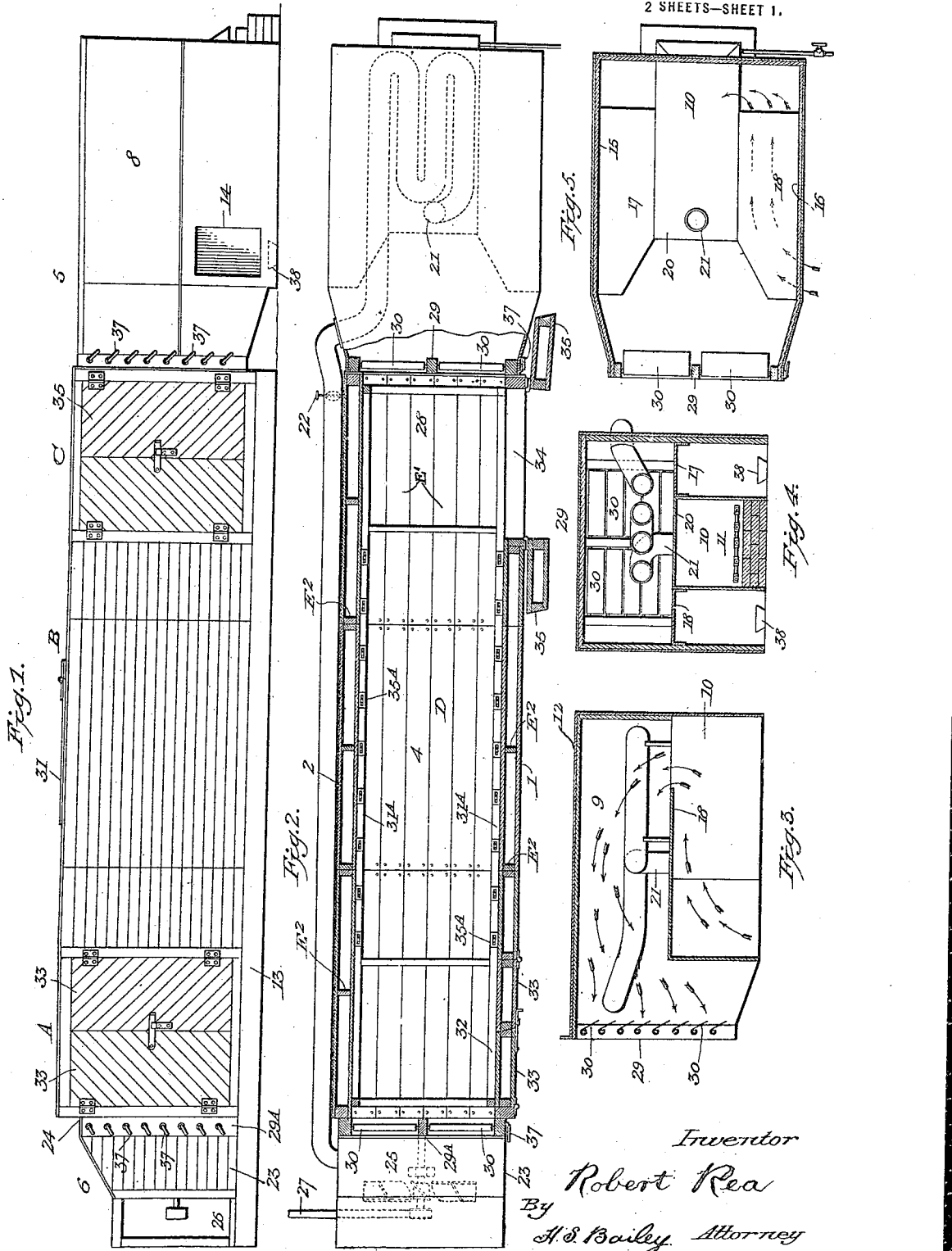

UNITED STATES PATENT OFFICE.

ROBERT REA, OF SAN FRANCISCO, CALIFORNIA.

DEHYDRATOR FOR FRUITS, VEGETABLES, AND OTHER FOODS.

1,410,719. Specification of Letters Patent. Patented Mar. 28, 1922.

Application filed October 15, 1920. Serial No. 417,210.

*To all whom it may concern:*

Be it known that I, ROBERT REA, a citizen of the United States of America, residing at the city and county of San Francisco and State of California, have invented a new and useful Dehydrator for Fruits, Vegetables, and other Foods, of which the following is a specification.

My invention relates to a dehydrator for fruits, vegetables and other foods.

And the objects of my invention are:

First: to provide a tunnel form of dehydrator in which the food product to be dehydrated is placed on screen bottomed trays and the trays are then inserted by hand into the coolest end of the tunnel, and the food product thereon is submitted to a regulated current of heated air generated at one end of the tunnel and drawn through the tunnel in contact with the product to be dehydrated, and in which the product is moved intermittently towards and to the hottest end, and is then removed by hand therefrom, when dehydrated.

Second: to provide a tunnel form of dehydrator that is constructed in individual sectional parts that are arranged to be secured together by bolts or other means when the dehydrator is erected at the place where it is to be used.

Third: to provide a simple, inexpensive and practical small tonnage capacity dehydrator for small community or individual use, that can be constructed at a manufacturing plant in completed sectional parts, adapted for shipping and its parts be set up and bolted or otherwise secured together in a short time.

I attain these objects by the mechanism illustrated in the accompanying drawings, in which:

Figure 1 is a side elevation of the improved dehydrator.

Fig. 2 is a sectional plan view of the same.

Fig. 3 is a sectional view of the heating chamber on the line 3—3 of Figure 2.

Fig. 4 is a transverse sectional view of the heating chamber.

Fig. 5 is a horizontal, sectional view of the same, on a plane above the top of the furnace.

Fig. 6 is a perspective view of the middle section of the dehydrator.

Fig. 7 is an enlarged side view of one of the tray-supporting cleats.

Fig. 8 is a front view of one of the shutter partitions.

Fig. 9 is an enlarged vertical sectional view of one of the shutter partitions.

Fig. 10 is a side view thereof; and

Fig. 11 is a perspective view of one of the trays supported on the slide cleats.

Referring to the drawings:

The numeral 1, designates the front side portion of my small unit dehydrator; the numeral 2, its rear side portion; the numeral 3, its roof portion; the numeral 4, its floor portion; the numeral 5, its heat generating end portion, and the numeral 6, its air discharging end portion.

I preferably build the tunnel portion of my fruit and vegetable and other food dehydrator in three sections, A, B, and C, and these three sections, when connected together, comprise the food product holding tunnel portion of my dehydrator, and the fruit or vegetables to be dehydrated, after being sliced or otherwise prepared, are placed on the screen bottom trays E, and the trays are placed on slideways, of which there are a number placed one above the other, and they extend throughout the length of the tunnel and are arranged so that there is a space between the trays through which heated air is drawn. There are, consequently, several rows of trays in the tunnel at a time, one row above the other, and extending the whole length of the tunnel, and these three sections A, B and C, are constructed so that when they are secured together, these tray supporting slideways are in alinement with each other, and each of the parts of each of these three sections is preferably completely constructed at a manufacturing plant before it is shipped to where the dehydrator is to be erected and operated, although there may be places where material and labor are plentiful, where the parts can be built and erected where the dehydrator is to be used.

The three sections of the tunnel portion of the dehydrator are also preferably built in equal lengths and in lengths best suited to economic construction and shipment and for quick and easy erection to the place where the dehydrator is to be erected. The several completed parts of each section are preferably arranged at the factory, to be bolted together when they are erected on their foundations, and the sections A, B, and C, are bolted together at their abutting corners, sides, ends, roof and floor portions, by bolts 7, or by any other suitable means.

To the outer end of the section C, I secure the inner end of a sheet metal box 8, the interior of which forms heated-air-receiving room 9, and in this room I place a fuel burning furnace 10, which may be of any suitable fuel burning type, as an air heating furnace would be selected that would use the kind of fuel that was the cheapest in the locality where the dehydrator is to be installed. Consequently, a furnace might be used that would burn wood up to about four foot lengths, or in which coal may be burned, or which would burn gasoline or distillate, or any other suitable fuel.

I preferably illustrate, however, a cast iron coal oil burner 11, that is set in the front end of the furnace 10. The metal furnace box 8, is preferably covered with asbestos 12, which may be secured to it in any suitable manner. This furnace holding metal box 8, rests on the ground at the end of the longitudinal foundation members 13, which are preferably in the form of wooden beams, and they extend from this furnace holding box under all of the sections of the dehydrator.

The air heating room 9, which is the inside of the metal box 8, is made enough larger than the fuel burning furnace 10, to form an air flue space all around the sides and top of the furnace 10, and this air space is in direct connection with two air inlet apertures 14, that are formed in and through the opposite side walls of the furnace holding metal box 8.

The furnace 10, may be of any practical shape or form, but as illustrated, it is square in outline, and the heat generated in it by the burning fuel radiates from its opposite sides 15 and 16, and in order to direct a part of the air that enters the air inlets, into the furnace room 9, along the opposite sides of the furnace, I place baffle plates 17 and 18, across the room 9, from the top of the furnace 10, which causes the air entering the air inlets 14, into this room 9, to be divided into three currents, one current flowing over the top of the furnace, and the other two currents flowing under the baffle plates on opposite sides 15 and 16, of the furnace.

The front end portion of this section of the furnace is closed at its front end around the front end of the furnace. The top or roof 20, of the furnace, is provided with a smoke pipe 21, which is provided with a damper 22. The smoke pipe is extended back and forth over the top of the furnace within the air and heat mixing room 9, and then extends out of the rear side of the furnace room through the rear side of the box and along the rear side of the tunnel portion D of the dehydrator, and enters the section A, into the air passageway 23, that is formed in the terminal end portion 24, of the section A in front of a suction fan 25, that is mounted in an open sided frame 26, that is formed on the end 24, of the section A. The fan 25, is driven by a belt 27, that is connected to any source of rotative power, which I do not illustrate.

This arrangement of the suction fan 25, creates a draft through the furnace and its smoke pipe, and the damper 22, in the smoke pipe allows the operator to regulate the draft of the furnace as he desires.

The inner end of the metal furnace holding box 8, is open, and consequently the heated air flows from it into a chamber 28, that is formed in the outer end of the tunnel section C. This chamber 28, I term the heat chamber of the dehydrator. The outflow of heated air from this heat chamber 28 is regulated by a damper containing partition 29. This partition 29, is provided with a vertical row of pivotally swinging and adjustably opening and closing dampers 30, and each damper 30, is placed in the partition 29, opposite to air passageways that are left in the open tunnel D, between each two fruit or vegetable holding trays E, or each two sets of trays in the vertical row, or stack of trays that are in the tunnel, and the suction fan 25, draws the heated air in horizontal paths through the dampers when they are open, from the heated air chamber 28, between each set of trays throughout the length of the tunnel D, to another similar damper which is placed on the opposite end of the tunnel in the outer end of the section A, and through its dampers also, and discharges it in to the atmosphere, as will be fully explained hereinafter. And the dampers 30, of each partition 29 and 29ᴬ are provided with pivotal rods 36, that are mounted in the opposite sides of the damper supporting partitions, but on the front side 1, of the tunnel the pivotal rod of each damper is extended through the side wall, of the dehydrator, and a hand grasping button 37, is secured on its end, that indicates its vertical position, which is its closed position, and also the amount of pivotally swinging opening inclination the operation gives to each damper to direct the heat between the trays, as it is neseccary to manipulate these dampers to get as hot air between the bottom and middle rows of trays, as into the upper portions of the trays. This is because the heated air in the heat chamber is apt to be hotter along its ceiling portion than along its floor portion, and also because the cool air enters the heating room and chamber at the floor portion. Consequently, each one of the dampers 30, can be manipulated by the operator by opening or closing or partially opening or closing them, as desired, to admit as much or as little of the heated air that flows from the heating chamber between the trays, as he desires, to keep the process of dehydration in all the trays in the vertical row of trays in the tunnel progressing evenly as they are moved intermittently throughout the tunnel, and so that the product of each tray in each vertical row of trays, when it reaches the hottest end of the tunnel, will be completely dehydrated.

This independent manipulation of the dampers 30, at the opposite ends of the tunnel, is necessary, as while the dampers at the hottest end of the tunnel are manipulated to regulate the volume of inflowing heat between the trays, the dampers at the coolest end of the tunnel are manipulated to prevent the suction fan from drawing the heated air out of the tunnel too fast, and to back it up, if necessary, and hold as much of it back in the tunnel as the operator desires.

An emergency door 31, is placed in the roof of the tunnel to allow any excess of heated air that may accumulate in the center of the tunnel, to escape, as well as to afford means of reaching the trays at this portion of the tunnel if occasion requires it.

The trays E, are inserted into the tunnel through an opening 32, formed in the outer end portion of the section A, and this opening 32, is closed by a pair of double doors 33, that are hinged to the side of the opening.

The section C is also provided with a tray removing opening 34, which is closed by double doors 35.

The opposite inside walls of the tunnel of each of these three sections are each provided with a vertical row of tray supporting cleats $31^A$, that form supporting slideways for the trays E, the said walls comprising boards $E^1$, which extend along the tunnel and are secured to the vertical studs $E^2$, that form the main supports of the sides 1 and 2, of the dehydrator.

The cleats $31^A$, are placed opposite to each other and also at equal distances apart from each other and also far enough apart to support the product holding trays between them and leave a clear space between each two trays. The tunnel is given a slight downward inclination from its tray receiving end to its opposite end, which facilitates the forward movement of the trays.

The sides 1 and 2, of the dehydrator are preferably made high enough to contain a plurality of tray supporting slideways, and I illustrate twelve tray supporting sets of cleats, and they are preferably spaced far enough apart to allow of an ample heated air flowing space between the trays. The cleats are provided at short distances apart throughout their lengths with rollers $35^A$, on which the trays are placed and in which they rest, and on which they are moved intermittently from the coolest end of the tunnel to its hottest end. These rollers $35^A$, are rotatively mounted and supported on the cleats in any suitable manner.

The operation is as follows:. When starting the dehydrator up to dehydrate a large amount of any fruit or vegetables, the furnace and fan having been started up, the tray entering doors are opened and a tray is pushed through the opening 32, in the section A, and is placed on opposite cleats, and as there are twelve slots shown, twelve trays are inserted on the cleats, and they are then each moved sidewise just far enough to be out of the doorways and towards the hottest end of the tunnel, and then twelve more trays are inserted and pushed against the ends of those already in the tunnel, and these are pushed out of the doorway, and this operation is repeated until each of the slideways is full of trays from the coolest end A, of the tunnel to its hottest end C. Then the tray inserting doors are closed and the tray removing doors are opened, and the vertical row of trays that are at the hottest end of the tunnel, the food product on which has become dehydrated, are all removed. Then these tray removing doors are closed and the tray inserting doors are again opened and twelve more trays are inserted and all are pushed along by it until the tray at the head of those in the tunnel is moved into the tray removing position and into the hottest portion in the tunnel; then the tray removing doors are again opened and twelve trays are removed, and the operation of inserting is again repeated, and the trays are very easily rolled along on the rollers of the downwardly inclined slideways by the pushing pressure of the hands of the operator.

In this step by step progressive movement of the trays which equals only the length of one tray at a time, all of the slideways in the tunnel are kept full of trays throughout their entire length, until the run on the product under treatment is completed.

The operator, between the periods of removing and filling, watches and regulates the temperature and adjusts the flow of the heat through the dampers to dehydrate the product on all of the vertical rows of trays in the tunnel by the time they have arrived at the removing doors in the section C.

As some fresh and ripe fruits and vegetables commence to discolor soon after being prepared for dehydration, I place a pan 38, of sulphur or other suitable chemical in the entrance of the air inlet apertures of the metal box mixing chamber, and the air, as it flows into this chamber, takes up the sulphur fumes and carries them into and through the tunnel, and thus arrests the oxidation of products.

My invention provides an easily operated food dehydrator, in which the food is subjected to a gradually increasing temperature of heated air from the time it is placed in the tunnel throughout its progressive movement therein, until it is dehydrated.

Having described my invention, what I claim as new and desire to secure by Letters Patent, is:

1. In a dehydrator for food products, the combination of a tunnel form of food product receiving and dehydrating structure, a heated air producing furnace at one end of said tunnel, a suction fan at the other end of said tunnel arranged to draw the heated air through said tunnel, adjustable dampers in said tunnel between said furnace and said fan, and a plurality of rows of tray supporting slideways extending throughout the length of said tunnel and arranged one above the other, and a plurality of trays provided with screen bottoms arranged to fit the slideways of said tunnel, and adapted to hold and convey the food product to be dehydrated, a door at the coolest end of said tunnel through which said trays are inserted and moved in intermittent tray length step by step order through the tunnel to its hottest end, and a door at the hottest end of said tunnel through which said trays are removed when said product is dehydrated, said dampers being arranged to extend across the width and throughout the tray receiving space in said tunnel, and arranged to be operated by said operator from the outside of said tunnel.

2. In a dehydrator for food products, the combination of a tunnel form of food product receiving and dehydrating structure, a heated air producing furnace at one end of said tunnel, a suction fan at the other end of said tunnel arranged to draw the heated air through said tunnel, adjustable dampers in said tunnel between said furnace and said fan, and a plurality of rows of tray supporting slideways extending throughout the length of said tunnel and arranged one above the other and a plurality of trays provided with screen bottoms arranged to fit the slideways of said tunnel, and adapted to hold and convey the food product to be dehydrated, a door at the coolest end of said tunnel a door in intermittent tray length step by step order through the tunnel to its hottest end, and means for removing said trays at the hottest end of said tunnel through which said trays are removed when said product is dehydrated, said dampers being arranged to extend across the width and throughout the tray receiving space in said tunnel, and arranged to be operated by said operator from the outside of said tunnel, said tunnel being inclined downwardly from its coolest end of said tunnel to its hottest end.

3. In a dehydrator for food products, the combination of a tunnel form of food product receiving and dehydrating structure, a heated air producing furnace at one end of said tunnel, a suction fan at the other end of said tunnel arranged to draw the heated air through said tunnel, adjustable dampers in said tunnel between said furnace and said fan, and a plurality of rows of tray supporting slideways extending throughout the length of said tunnel and arranged one above the other, and a plurality of trays provided with screen bottoms arranged to fit the slideways of said tunnel, and adapted to hold and convey the food product to be dehydrated, doors at the opposite ends of said tunnel, said dampers being arranged to extend across the width and throughout the tray receiving space in said tunnel, and arranged to be operated by said operator from the outside of said tunnel, said tunnel and its tray supporting slideways being inclined downwardly from the coolest end of said tunnel to its hottest end; said dampers being provided with pivotal rods that extend through the tray inserting side of said tunnel, and buttons on the ends of each of said rods indicating the position of each damper; and said tray supporting slideways being provided with rollers on which said trays rest and are moved.

4. In a dehydrator, the combination of a tunnel form of food dehydrator constructed of independent sections and adapted to be secured together; means for producing and admitting heated air at one end of said tunnel; means for drawing the heated air through said tunnel; slideways in said tunnel arranged to support food holding trays; and a door for the insertion of said trays in the coolest end of said tunnel on said slideways; whence they are moved forward by the insertion of each succeeding tray to its hottest end; and a door at the hottest end of said tunnel through which the trays are removed.

5. In a dehydrator, the combination of a tunnel form of food dehydrator constructed of independent sections, and adapted to be secured together; means for producing and admitting heated air at one end of said tunnel; means for drawing the heated air through said tunnel; slideways in said tunnel arranged to support food holding trays; and a door at each end of said tunnel, said sections being arranged and adapted to be constructed at a manufacturing plant and to be shipped to the place where they are to be used; and arranged and adapted to be bolted or otherwise secured together as said sections are erected into an operative food product dehydrator.

6. In a dehydrator, the combination of a tunnel form of food dehydrator constructed of independent sections, and adapted to be secured together; means for producing and admitting heated air at one end of said tunnel; means for drawing the heated air through said tunnel; slideways in said tunnel arranged to support food holding trays; said sections being arranged and adapted to be constructed at a manufacturing plant and to be shipped to the place where they are to be used; and arranged and adapted to be bolted or otherwise secured together as said sections are erected into an operative food product dehydrator; said sections comprising middle tunnel section and a doored tunnel section, adapted to be secured to each of its opposite ends; a heated air producing furnace section at the outer end of one of said doored sections, and a suction fan section arranged to be secured to the outer end of the other doored section.

7. In a dehydrator, the combination of a tunnel form of food dehydrator constructed of independent sections, and adapted to be secured together; means for producing and admitting heated air at one end of said tunnel; means for drawing the heated air through said tunnel; slideways in said tunnel arranged to support food holding trays; said sections comprising middle tunnel section and a doored tunnel section, adapted to be secured to each of its opposite ends: a heated air producing furnace section at the outer end of one of said doored sections, and a suction fan section arranged to be secured to the outer end of the other doored section; a plurality of food-carrying trays arranged to be inserted into said suction fan provided tunnel section and moved manually through said suction fan section into and through said middle tunnel section, and into said furnace attached tunnel section to its end, and to be removed therefrom through its doors, said trays being adapted to fill said tunnel throughout its length and are manually moved in step by step intermittent movements of the length of a tray at a time to the hottest end of said tunnel.

8. In a dehydrator, the combination of a tunnel form of food dehydrator constructed of independent sections, and adapted to be secured together; means for producing and admitting heated air at one end of said tunnel; means for drawing the heated air through said tunnel; slideways in said tunnel arranged to support food holding trays and doors at opposite ends of said tunnel; a set of adjustable dampers arranged to control and to direct the entrance of the heated air from said heated air producing furnace into the tunnel formed by said sections; and a set of adjustable dampers in the tray inserting section between its doors and said suction fan for controlling and directing the outflow of the heated air from said tunnel sections of said dehydrator.

9. In a dehydrator, the combination of a tunnel form of food dehydrator constructed of independent sections, and adapted to be secured together; means for producing and admitting heated air at one end of said tunnel; means for drawing the heated air through said tunnel; slideways in said tunnel arranged to support food holding trays and doors at opposite ends of said tunnel; a set of adjustable dampers arranged to control and to direct the entrance of the heated air from said heated air producing furnace into the tunnel formed by said sections; and a set of adjustable dampers in the tray inserting section between its doors and said suction fan for controlling and directing the outflow of the heated air from said tunnel sections of said dehydrator; said sections being composed of independently and completely made up individual parts consisting of independent side members of said tunnel having said tray slideway attached to them and independent roof members, and independent floor members, all arranged and adapted to be assembled and secured together into an operative food product dehydrating plant said tunnel having a downward inclination from the tray receiving end to the opposite end.

10. The combination in a dehydrator, of a doored tunnel form of section, provided with slideways, adapted to have food supporting trays inserted in it and moved through it on said slideways; a section secured to said tray receiving section, provided with a suction fan; and a vertical row of dampers in said tray receiving sections, between its door and said suction fan supporting section.

11. The combination in a dehydrator, of a doored tunnel section provided with tray supporting slideways, and arranged to permit trays to be moved through it on said slideways, and removed from it through said doors; of a heated air producing furnace and its air inlets and treated-air-receiving room secured to the outer end of said tunnel section; and a heat chamber member in the end junction of said tunnel section and said heated-air-receiving room; and a vertical row of adjustable dampers in said tunnel section, positioned between the doors of said tunnel section and said heat chamber.

12. The combination in a dehydrator, of a heated air receiving, tray removing section and a tray receiving suction fan section with an intermediate or middle section, arranged to be connected to said heat receiving and tray removing sections and heat removing and tray receiving sections; and all of said sections being provided with tray receiving and supporting slideways, provided with rollers on which said trays are placed and moved, said sections being downwardly inclined from said tray receiving section, through said middle section and through said tray removing section.

13. The combination in a dehydrator, of a heated air receiving, tray removing section and a tray receiving suction fan section with an intermediate or middle section, arranged to be connected to said heat receiving and tray removing section and heat removing and tray receiving section; and all of said section being provided with tray receiving and supporting slideways, provided with rollers on which said trays are placed and moved, said sections being downwardly inclined from said tray receiving section, through said middle section and through said tray removing section; said middle section being provided with a door in its roof, and sectionally built tunnel being adapted to receive food supporting trays on its roller provided with slideways throughout its length and height in its tray receiving section.

14. In a dehydrator, the combination of a fan section and a tunnel section with a heated air producing section, consisting of a metal box provided with air inlet apertures and a fuel-burning furnace within said metal box and of smaller size than the interior of said box; a smoke pipe extending through said metal box and extending along said tunnel section and entering said fan section just in front of said fan.

15. In a dehydrator, the combination of a fan section and a tunnel section with the heated air producing section, consisting of a metal box provided with air inlet apertures and a fuel-burning furnace within said metal box and of smaller size than the interior of said box; a smoke pipe extending through said metal box and extending along said tunnel section and entering said fan section just in front of said fan; said smoke pipe being formed into return bend coils on the top of said furnace.

In testimony whereof I affix my signature in presence of two witnesses.

ROBERT REA.

Witnesses:
ELIZABETH ROTHE,
G. SARGENT ELLIOTT.